United States Patent [19]
Noritake

[11] Patent Number: 5,514,322
[45] Date of Patent: May 7, 1996

[54] RIM METHOD OF MOLDING THERMOPLASTIC RESIN

[75] Inventor: Yoshiyuki Noritake, Nagoya, Japan

[73] Assignee: Toyota Jidosha Kabushiki Kaisha, Japan

[21] Appl. No.: 154,516

[22] Filed: Nov. 19, 1993

[30] Foreign Application Priority Data

Nov. 20, 1992 [JP] Japan .................... 4-312054
Nov. 26, 1992 [JP] Japan .................... 4-317109
Jan. 22, 1993 [JP] Japan .................... 5-009182

[51] Int. Cl.$^6$ .......................... C08G 69/16; B29C 69/00
[52] U.S. Cl. .................... 264/240; 528/220; 528/222; 528/224; 528/310; 528/361; 528/401; 525/420; 524/701; 524/730; 524/755; 524/777; 524/788; 524/795; 264/299; 264/328.1; 264/328.8; 264/331.11; 264/540
[58] Field of Search .................... 528/220, 222, 528/224, 310, 361, 401; 525/420; 524/701, 730, 755, 777, 788, 795; 264/540, 240, 299, 328.1, 328.8, 331.11, D56

[56] References Cited

U.S. PATENT DOCUMENTS

4,778,875 10/1988 Stewart .................... 528/371
4,853,459 8/1989 Stewart .................... 528/371

FOREIGN PATENT DOCUMENTS

58-127733 7/1983 Japan .
59-138226 8/1984 Japan .

OTHER PUBLICATIONS

"Fabrication Of Thermoplastic Matrix Structural Composites By Resin Transfer Molding Of Cyclic Bisphenol-A Polycarbonate Oligomers", Salem et al., Sampe Journal, vol. 27, No. 1, pp. 1 & 17–22, Jan./Feb. 1991.

Primary Examiner—Samuel A. Acquah

[57] ABSTRACT

An RIM method of thermoplastic resin comprises a process for preparing materials in which one compound (i) is mixed with a material for thermoplastic resin to prepare one mixture (I), and the other compound (ii) is mixed with a material for thermoplastic resin to prepare the other mixture (II), each of two compounds (i) and (ii) being inactive to the material for thermoplastic resin but producing a high-active anionic polymerization catalyst by their reaction, a process for polymerization in which the mixture (I) and the mixture (II) are mixed, injected into a mold, and polymerized by the anionic polymerization catalyst, an ejecting process in which a solidified thermoplastic resin molded body is ejected from the mold. Therefore, a polymerization reaction cannot be started before the material for thermoplastic resin is injected into the mold, and it begins soon after the material for thermoplastic resin is injected into the mold.

29 Claims, 2 Drawing Sheets

1

RIM METHOD OF MOLDING THERMOPLASTIC RESIN

BACKGROUND OF THE INVENTION

1. Field of the Invention

The present invention relates to a Reaction Injection Molding (RIM) method of thermoplastic resin such as polyester, polycarbonate and so on.

2. Description of the Related Art

In a conventional RIM method, a material for thermoplastic resin is mixed with a polymerization catalyst to be injected into a mold, and the material for thermoplastic resin is polymerized in the mold to form a thermoplastic resin molded body.

Japanese Laid-Open Patent Publication No. 127733/1983 discloses an RIM method of nylon as follows. At first, an annular lactam such as ε-caprolactam is mixed with a polymerization catalyst to make a component (A). Then, an annular lactam is mixed with a polymerization accelerator and an epoxy element to make a component (B). After each of two components (A) and (B) is heated and fused, they are mixed and injected into a mold having high temperature to be polymerized.

As described in detail, the polymerization catalyst of the component (A) includes hydride of alkaline metals or alkaline earth metals, alkylhalide, hydroxide, an organic metal compound and so on. The polymerization accelerator of the component (B) includes terephthaloyl biscaprolactam and so on. Each of the components (A) and (B) is heated and fused at the temperature of 70° C. to 100° C., and then, they are mixed and injected into the mold having the temperature of 100° C. to 200° C.

U.S. Pat. Nos. 4,853,459, 4,778,875 and SAMPE Journal, Vol. 27, No. 1, 1991 disclose an RIM method of polyester or polycarbonate in which an annular carbonate or an annular ester is mixed with a polymerization catalyst such as a metal oxide or an organic metal compound. After that, it is heated, fused and injected into a mold having high temperature to be polymerized by a ring-opening addition-polymerization.

In the above-described molding methods, a reaction of material for thermoplastic resin is occurred before the material for thermoplastic resin is injected into a mold. For example, in Japanese Laid-Open Patent Publication No. 127733/1983, a polymerization reaction begins at the time of heating and fusing since an annular lactam exists with a polymerization catalyst having high-activity in the component (A). In U.S. Pat. Nos. 4,853,459, 4,778,875 and SAMPE Journal, Vol.27, No.1, 1991, a polymerization reaction begins at the time of heating and fusing since an annular material exits with a polymerization catalyst.

When the polymerization reaction begins before the material for thermoplastic resin is injected into the mold, the viscosity of the component at the time of injection increases, and a fluidity of the component in the mold deteriorates. This causes an insufficient molding. In the worst case, the material for thermoplastic resin is resinified before it is injected into the mold.

Furthermore, when a reinforced fiber is arranged in the mold and a resin is impregnated into the reinforced fiber to form FRP, an increase in viscosity prevents thermoplastic resin material from being impregnating into fiber, and a satisfactory strength is not obtained.

To solve the above disadvantages, a polymerization catalyst having low activity is used in order to lower the rate of polymerization. In this case, a low viscosity condition can be maintained for a long time, and fluidity in the mold and impregnation characteristics of the component are improved. However, a polymerization reaction in the mold becomes deteriorated and it takes too much time for molding.

SUMMARY OF THE INVENTION

An object of the present invention is to provide an RIM method of thermoplastic resin in which a polymerization reaction cannot be started before a material for thermoplastic resin is injected into a mold.

Another object of the present invention is to provide an RIM method of thermoplastic resin in which a polymerization reaction begins soon after a material for thermoplastic resin is injected into a mold.

The other object of the present invention is to provide an RIM method of thermoplastic resin in which the time for polymerization can be controlled.

An RIM method of thermoplastic resin according to the present invention comprises a process for preparing materials in which one compound (i) is mixed with a material for thermoplastic resin to prepare one mixture (I), and the other compound (ii) is mixed with a material for thermoplastic resin to prepare the other mixture (II), each of two compounds (i) and (ii) being inactive to the material for thermoplastic resin but producing a high-active anionic polymerization catalyst by their reaction, a process for polymerization in which the mixture (I) and the mixture (II) are mixed, injected into a mold, and polymerized by the anionic polymerization catalyst, an ejecting process in which a solidified thermoplastic resin molded body is ejected from the mold.

Compounds which can be polymerized by an anionic addition-polymerization are used for the material for thermoplastic resin. These compounds include an annular lactam, an annular lactone, an annular carbonate and so on.

One example for a combination of the compound (i) and the compound (ii) is $(R^1)$—O—Si—$(R^2)_3$ and $(R^3)$—F. $R^1$ is an alkyl group or an aryl group, preferably, a phenyl group, a methyl group, an ethyl group, a propyl group, an isopropyl group or a butyl group.

$R^2$ is an alkyl group or an aryl group, preferably, a phenyl group, a methyl group, an ethyl group, an isopropyl group.

$R^3$ is an alkaline metal or an organic ammonium salt, preferably, Li, Na, K, Cs, tetramethyl ammonium or tetrabutyl ammonium.

Another example for a combination of the compound (i) and the compound (ii) is $(R^4)_3$—B and $Ml_2$—$CO_3$. $R_4$ is an alkyl group or an aryl group, preferably, a butyl group or a phenyl group. M1 is an alkaline metal, preferably, Li, Na or K.

When an anionic polymerization catalyst can be four coordinated boron compound represented as $(R^5)_4B^{-+}N(R^6)_4$, the compound (i) is a boron compound represented as $(R^5)_4B^{-+}M2$, and the compound (ii) is an ammonium salt represented as $(R^6)_4N^{+-}$ $(R^7)$.

$R^5$ is an alkyl group or an aryl group, preferably, a phenyl group, a methyl group, an ethyl group, a propyl group, an isopropyl group or a butyl group.

$R^6$ is an alkyl group or an aryl group, preferably, a phenyl group, a methyl group, an ethyl group, an isopropyl group or a butyl group.

$R^7$ is a halogen group or a hydroxyl group. The halogen group is preferably a chlorine group, a bromine group or a fluorine group.

M2 is an alkaline metal, preferably, Li, Na, K or Cs.

When the compound (i) is $(R^8)$—O—Si—$(R^9)_3$ or $(R^{12})$—O—Si—$(R^{13})_3$ and the compound (ii) is $(R^{10})$—F or $(R^{14})$—F, it is preferable that at least one of two mixtures (I) and (II) is mixed with a compound (iii) which is classified into Lewis acid having no polymerization activity. The compound (iii) can be mixed with one or both of two mixtures (I) and (II). The time for polymerization can be controlled in accordance with a mixed amount of the compound (iii). The more mixed amount of the compound (iii) is, the shorter the time for polymerization is.

$R^8$ or $R^{12}$ is an alkyl group or an aryl group, preferably, a phenyl group, a methyl group, an ethyl group, a propyl group, an isopropyl group or a butyl group.

$R^9$ or $R^{13}$ is an alkyl group or an aryl group, preferably, a phenyl group, a methyl group, an ethyl group, an isopropyl group.

$R^{10}$ or $R^{14}$ is an alkaline metal or an organic ammonium salt, preferably, Li, Na, K, Cs, tetramethyl ammonium or tetrabutyl ammonium.

The compound (iii) is classified into Lewis acid, and it never reacts with the compound (i), the compound (ii) and the material for thermoplastic resin. For example, Al—$(R^{11})_3$ or B—$(R^{15})_3$ can be used as the compound (iii). $R^{11}$ is an alkoxy group or a halogen group, preferably, a methoxy group, an ethoxy group, a butoxy group, a propoxy group, an isopropoxy group, bromine, chlorine or fluorine.

$R^{15}$ is an alkyl group or an aryl group, preferably, a phenyl group, a methyl group, an ethyl group, a propyl group, an isopropyl group or a butyl group.

The mixed amount of the compound (iii) is in the range of 50 to 200% against the total amount of the compound (i) and the compound (ii).

In the process for preparing materials, the compound (i) is mixed with the material for thermoplastic resin to be the mixture (I), and the compound (ii) is mixed with the material for thermoplastic resin to be the mixture (II). At this time, the mixed amount of the compound (i) is in the range of 0.01 to 10 mol %, preferably, 0.1 to 5 mol %. Similarly, the mixed amount of the compound (ii) is in the range of 0.01 to 10 mol %, preferably, 0.1 to 5 mol %. When the mixed amount of the compound (i) and the compound (ii) is less than the above range, the rate of polymerization in the mold becomes lower. When the mixed amount of the compound (i) and the compound (ii) is more than the above range, no more effect can be obtained, impurities in the obtained resin increases and a molecular weight decreases.

In the process for polymerization, the mixture (i) and the mixture (II) are mixed and immediately injected into the mold. The mixture (I) and the mixture (II) can be injected into the mold immediately after they are mixed outside of the mold. The mixture (I) and the mixture (II) are injected into the mold so as to be mixed in the mold. The mixture (I) and the mixture (II) can be mixed after each of them is heated and fused. When the compound (i) is contacted with the compound (ii) by means of the above mixture, the anionic polymerization catalyst is generated by the following reaction which is represented as chemical formulas (13), (14) or (15). Therefore, the anionic polymerization of the material for thermoplastic resin begins.

It is preferable that the mixture (I) is mixed with the mixture (II) in such a manner that a molar ratio of the compound (i) to the compound (ii) is in the range of 1:1 to 1:1.5, more preferably 1:1 to 1:1.2. When the molar ratio is more than 1:1, a generating amount of the anionic catalyst decreases. When the molar ratio is less than 1:1.5, a remaining amount of the compound (ii) as impurities increases.

In the RIM method according to the present invention, each of two compounds (i) and (ii) is inactive to the material for thermoplastic resin. The compound (iii) is also inactive to the compound (i), the compound (ii) and the material for thermoplastic resin. Namely, each of the mixtures (I) and (II) is a stable mixture, and no reaction occurs when it is heated and fused. So, the low viscosity condition is maintained until the mixture (I) and the mixture (II) are mixed and the reaction begins. Therefore, a resinification never occurs before injection, and an excellent impregnation characteristic can be obtained at the time of forming FRP.

When the mixture (I) and the mixture (II) are mixed, the compound (i) is contacted with the compound (ii) to cause the reaction represented as the chemical formula (13), (14) or (15), thereby generating the anionic polymerization catalyst.

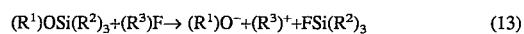

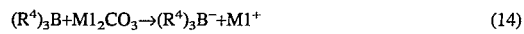

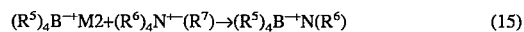

In the chemical formula (13), alkoxide anion is generated, and boron anion as Lewis base is generated in the chemical formula (14).

In the chemical formula (15), four coordinated boron compound as an anionic polymerization catalyst having high activity is generated.

The generated anion is functioned as a polymerization catalyst, and a polymerization reaction of the material for thermoplastic resin progresses. The time for polymerization can be controlled by means of the compound (iii), and it can be shortened. Therefore, a thermoplastic resin molded body is formed, solidified by cooling and ejected from the mold to complete the process for molding.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Having generally described the present invention, a further understanding can be obtained by reference to the specific preferred embodiment which is provided herein for purposes of illustration only and is not intended to limit the scope of the appended claims.

First Preferred Embodiment

A First Preferred Embodiment employed the following compositions and the following manners to obtain a molded body.

20 g (78.65 mmol) of an annular carbonate as a material for thermoplastic resin and 0.26 g (1.57 mmol) of phenyl trimethyl silyl ether ($PhOSi(CH_3)_3$) as a compound (i) were uniformly mixed in a closing vessel in an argon gas to prepare a mixture (I).

20 g (78.65 mmol) of an annular carbonate as a material for thermoplastic resin and 1.88 ml of THF (tetrahydrofuran) solution having 1M condensation of tetrabutyl ammonium fluoride (($C_4H_9)_4NF$) as a compound (ii) were uniformly mixed in a closing vessel in an argon gas and THF was removed in a vacuum to prepare a mixture (II).

Each of the above mixtures (I) and (II) was heated and fused at the temperature of 250° C., and then, each mixture was maintained for 24 hours at the temperature of 250° C. At that time, each mixture showed no change, and no polymerization reaction occurred.

Figure 1:
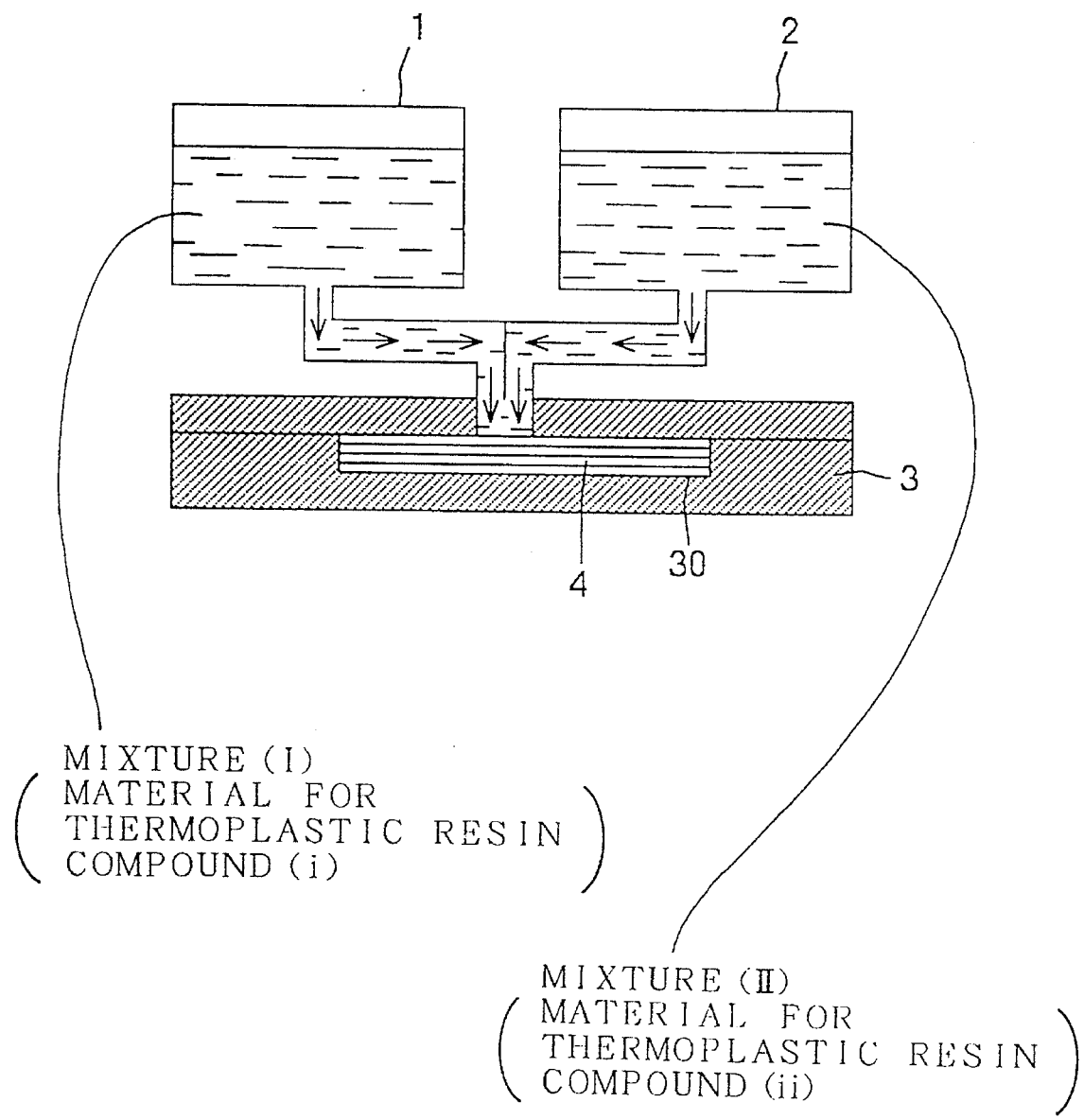
FIG. 1 is a diagrammatic explanatory view for showing an RIM method according to the present invention.

After that, as shown in FIG. 1, each of two closing vessels 1 and 2 was filled with argon gas, and two mixtures (I) and (II) were injected into a cavity 30 of a mold 3 having the temperature of 250° C. by gravity at the same time while maintaining the mixing and fusing condition. Since reinforced fibers 4 were arranged in a cavity 30 of the mold 3, the mixture (I) and the mixture (II) were mixed and impregnated into the reinforced fibers 4 to fill the cavity 30. Then, the mixed content was maintained for 30 minutes at the temperature of 250° C., and the mold 3 was cooled, thereby obtaining a FRP molded body of polycarbonate having an average molecular weight (Mw) of 11,000. The appearance of the obtained molded body was normal and polycarbonate was surely impregnated into reinforced fibers.

Second Preferred Embodiment

A Second Preferred Embodiment employed the same compositions and the same manners as described in the First Preferred Embodiment except that 1.57 mmol of the compound (ii) was used; thereby obtaining a molded body having the Mw of 11,000.

Third Preferred Embodiment

A Third Preferred Embodiment employed the same compositions and the same manners as described in the Second Preferred Embodiment except that the temperature of polymerization (the temperature of the mold 3) was 300° C. and that the time for polymerization (the time for maintaining the mixed content in the mold 3) was 15 minutes; thereby obtaining a molded body having the Mw of 15,500.

Fourth Preferred Embodiment

A Fourth Preferred Embodiment employed the same compositions and the same manners as described in the Third Preferred Embodiment except that 0.79 mmol of the compound (i) and 0.79 mmol of the compound (ii) were used; thereby obtaining a molded body having the Mw of 22,500.

Fifth Preferred Embodiment

A Fifth Preferred Embodiment employed the same compositions and the same manners as described in the First Preferred Embodiment except that 0.79 mmol of the compound (i) and 0.79 mmol of the compound (ii) were used; thereby obtaining a molded body having the Mw of 21,500.

The above results are shown in Table 1.

TABLE 1

| Embod. | Amount of Compound (i) (mmol) | Amount of Compound (ii) (mmol) | Temper. of polymerization (°C.) | Time for Polymerization (min.) | Mw |
| --- | --- | --- | --- | --- | --- |
| 1 | 1.57 | 1.88 | 250 | 30 | 11,000 |
| 2 | 1.57 | 1.57 | 250 | 30 | 11,000 |
| 3 | 1.57 | 1.57 | 300 | 15 | 15,500 |
| 4 | 0.79 | 0.79 | 300 | 15 | 22,500 |
| 5 | 0.79 | 0.79 | 250 | 30 | 21,500 |

Sixth Preferred Embodiment

A Sixth Preferred Embodiment employed the following compositions and the following manners to obtain a molded body. 20 g (78.65 mmol) of an annular carbonate as a material for thermoplastic resin and 0.38 g (1.57 mmol) of triphenyl boron (($Ph)_3B$) as a compound (i) were uniformly mixed in a closing vessel in an argon gas to prepare a mixture (I).

20 g (78.65 mmol) of an annular carbonate as a material for thermoplastic resin and 0.12 g (1.57 mmol) of a lithium carbonate ($Li_2CO_3$) as a compound (ii) were uniformly mixed in a closing vessel in an argon gas to prepare a mixture (II).

Each of the above mixtures (I) and (II) was heated and fused at the temperature of 250° C., and then, each mixture was maintained for 24 hours at the temperature of 250° C. At that time, each mixture showed no change, and no polymerization reaction occurred.

After that, as shown in FIG. 1, each of two closing vessels 1 and 2 was filled with argon gas, and two mixtures (I) and (II) were injected into a cavity 30 of a mold 3 having the temperature of 250° C. by gravity at the same time while maintaining the mixing and fusing condition. Thus, the mixture (I) and the mixture (II) were mixed. Then, the mixed content was maintained for 10 minutes at the temperature of 250° C., and the mold was cooled, thereby obtaining a molded body of polycarbonate having an average molecular weight (Mw) of 15,500.

Seventh Preferred Embodiment

A Seventh Preferred Embodiment employed the same compositions and the same manners as described in the Sixth Preferred Embodiment except that the temperature of polymerization was 300° C. and that the time for polymerization was 5 minutes; thereby obtaining a molded body having the Mw of 16,500.

Eighth Preferred Embodiment

An Eighth Preferred Embodiment employed the same compositions and the same manners as described in the Seventh Preferred Embodiment except that 0.79 mmol of the compound (i) and 0.79 mmol of the compound (ii) were used; thereby obtaining a molded body having the Mw of 21,000.

The above results are shown in Table 2.

TABLE 2

| Embod. | Amount of Compound (i) (mmol) | Amount of Compound (ii) (mmol) | Temper. of polymerization (°C.) | Time for Polymerization (min.) | Mw |
| --- | --- | --- | --- | --- | --- |
| 6 | 1.57 | 1.57 | 250 | 10 | 15,500 |
| 7 | 1.57 | 1.57 | 300 | 5 | 16,500 |
| 8 | 0.79 | 0.79 | 300 | 5 | 21,000 |

Ninth Preferred Embodiment

A Ninth Preferred Embodiment employed the following compositions and the following manners to obtain a molded body.

20 g (78.65 mmol) of an annular carbonate as a material for thermoplastic resin and 0.27 g (0.79 mmol) of tetraphenyl sodium boride $((Ph)_4B^-\ {}^+Na)$ as a compound (i) were uniformly mixed in a closing vessel in an argon gas to prepare a mixture (I).

20 g (78.65 mmol) of an annular carbonate as a material for thermoplastic resin and 0.79 ml of THF (tetrahydrofuran) solution having 1M condensation of tetrabutyl ammonium chloride $((C_4H_9)_4NCl)$ as a compound (ii) were uniformly mixed in a closing vessel in an argon gas and THF was removed in a vacuum to prepare a mixture (II).

Each of the above mixtures (I) and (II) was heated and fused at the temperature of 250° C., and then, each mixture was maintained for 24 hours at the temperature of 250° C. At that time, each mixture showed no change, and no polymerization reaction occurred.

After that, as shown in FIG. 1, each of two closing vessels 1 and 2 was filled with argon gas, and two mixtures (I) and (II) were injected into a cavity 30 of a mold 3 having the temperature of 250° C. by gravity at the same time while maintaining the mixing and fusing condition. Then, the mixture (I) and the mixture (II) were mixed for 1 minute, thereby obtaining a molded body of polycarbonate having an average molecular weight (Mw) of 56,000.

Tenth Preferred Embodiment

A Tenth Preferred Embodiment employed the same compositions and the same manners as described in the Ninth Preferred Embodiment except that 0.16 mmol of $((Ph)_4BNa)$ and 0.16 mmol of $(C_4H_9)_4NCl$ were used; thereby obtaining a molded body having the Mw of 95,000.

Eleventh Preferred Embodiment

An Eleventh Preferred Embodiment employed the same compositions and the same manners as described in the Ninth Preferred Embodiment except that 0.79 mmol of $(C_4H_9)_4NOH$ was used instead of $((C_4H_9)_4NCl)$; thereby obtaining a molded body having the Mw of 48,000.

Twelfth Preferred Embodiment

A Twelfth Preferred Embodiment employed the same compositions and the same manners as described in the Ninth Preferred Embodiment except that 0.16 mmol of $((Ph)_4BNa)$ and 0.16 mmol of $(C_4H_9)_4NOH$ were used; thereby obtaining a molded body having the Mw of 87,000.

Thirteenth Preferred Embodiment

A Thirteenth Preferred Embodiment employed the same compositions and the same manners as described in the Ninth Preferred Embodiment except that 0.79 mmol of $(Ph)_4BLi$ was used instead of $((Ph)_4B^-\ {}^+Na)$; thereby obtaining a molded body having the Mw of 58,000.

Fourteenth Preferred Embodiment

A Fourteenth Preferred Embodiment employed the same compositions and the same manners as described in the Ninth Preferred Embodiment except that 0.16 mmol of $((Ph)_4BLi)$ and 0.16 mmol of $(C_4H_9)_4NCl$ were used; thereby obtaining a molded body having the Mw of 115,000.

Fifteenth Preferred Embodiment

A Fifteenth Preferred Embodiment employed the same compositions and the same manners as described in the Thirteenth Preferred Embodiment except that the time for polymerization was 1 to 2 minutes; thereby obtaining a molded body having the Mw of 55,000.

The above results are shown in Table 3.

TABLE 3

| Embod. | Amount of Compound (i) (mmol) | Amount of Compound (ii) (mmol) | Temper. of polymerization (°C.) | Time for Polymerization (min.) | Mw |
| --- | --- | --- | --- | --- | --- |
| 9 | $(Ph)_4BNa$ 0.79 | $(C_4H_9)_4NCl$ 0.79 | 250 | ≦1 | 56,000 |
| 10 | $(Ph)_4BNa$ 0.16 | $(C_4H_9)_4NCl$ 0.16 | 250 | ≦1 | 95,000 |
| 11 | $(Ph)_4BNa$ 0.79 | $(C_4H_9)_4NOH$ 0.79 | 250 | ≦1 | 48,000 |
| 12 | $(Ph)_4BNa$ 0.16 | $(C_4H_9)_4NOH$ 0.16 | 250 | ≦1 | 87,000 |
| 13 | $(Ph)_4BLi$ 0.79 | $(C_4H_9)_4NCl$ 0.79 | 250 | ≦1 | 58,000 |
| 14 | $(Ph)_4BLi$ 0.16 | $(C_4H_9)_4NCl$ 0.16 | 250 | ≦1 | 115,000 |
| 15 | $(Ph)_4BLi$ 0.79 | $(C_4H_9)_4NCl$ 0.79 | 250 | 1–2 | 55,000 |

Sixteenth Preferred Embodiment

A Sixteenth Preferred Embodiment employed the following compositions and the following manners to obtain a molded body.

20 g (78.65 mmol) of an annular carbonate as a material for thermoplastic resin and 0.26 g (1.57 mmol) of phenyl trimethyl silyl ether $(PhOSi(CH_3)_3)$ as a compound (i) were uniformly mixed in a closing vessel in an argon gas to prepare a mixture (I).

20 g (78.65 mmol) of an annular carbonate as a material for thermoplastic resin, 1.75 ml of THF (tetrahydrofuran) solution having 1M condensation of tetrabutyl ammonium fluoride $((C_4H_9)_4NF)$ as a compound (ii) and 0.16 g (0.78 mmol) of aluminum triisopropyl oxide $(Al(O^iPr)_3)$ as a compound (iii) were uniformly mixed in a closing vessel in an argon gas and THF was removed in a vacuum to prepare a mixture (II).

Each of the above mixtures (I) and (II) was heated and fused at the temperature of 250° C., and then, each mixture was maintained for 24 hours at the temperature of 250° C.

At that time, each mixture showed no change, and no polymerization reaction occurred.

After that, as shown in FIG. 1, each of two closing vessels 1 and 2 was filled with argon gas, and two mixtures (I) and (II) were injected into a cavity 30 of a mold 3 having the temperature of 250° C. by gravity at the same time while maintaining the mixing and fusing condition. Since reinforced fibers 4 were arranged in a cavity 30 of the mold 3, the mixture (I) and the mixture (II) were mixed and impregnated into the reinforced fibers 4 to fill the cavity 30. Then, the mixed content was maintained for 18 minutes at the temperature of 250° C., and the mold 3 was cooled, thereby obtaining a FRP molded body of polycarbonate having an average molecular weight (Mw) of 11,500. The appearance of the obtained molded body was normal and polycarbonate was surely impregnated into reinforced fibers.

Seventeenth Preferred Embodiment

A Seventeenth Preferred Embodiment employed the same compositions and the same manners as described in the Sixteenth Preferred Embodiment except that 0.80 mmol of $(Al(O^iPr)_3)$ was used and that the temperature of polymerization was 300° C. and that the time for polymerization was 10 minutes; thereby obtaining a molded body having the Mw of 15,500.

Eighteenth Preferred Embodiment

An Eighteenth Preferred Embodiment employed the same compositions and the same manners as described in the Seventeenth Preferred Embodiment except that 1.60 mmol of $(Al(O^iPr)_3)$ was used and that the time for polymerization was 7.5 minutes; thereby obtaining a molded body having the Mw of 16,500.

Nineteenth Preferred Embodiment

A Nineteenth Preferred Embodiment employed the same compositions and the same manners as described in the Seventeenth Preferred Embodiment except that 3.20 mmol of $(Al(O^iPr)_3)$ was used and that the time for polymerization was 5 minutes; thereby obtaining a molded body having the Mw of 15,000.

Twentieth Preferred Embodiment

A Twentieth Preferred Embodiment employed the same compositions and the same manners as described in the Sixteenth Preferred Embodiment except that 0.80 mmol of triphenyl boron $(BPh_3)$ was used instead of 0.78 mmol of $(Al(O^iPr)_3)$ and that the time for polymerization was 15 minutes; thereby obtaining a molded body having the Mw of 12,000.

Twenty-first Preferred Embodiment

A Twenty-first Preferred Embodiment employed the same compositions and the same manners as described in the Twentieth Preferred Embodiment except that 1.60 mmol of $BPh_3$ was used and that the time for polymerization was 5 minutes; thereby obtaining a molded body having the Mw of 12,500.

Twenty-second Preferred Embodiment

A Twenty-second Preferred Embodiment employed the same compositions and the same manners as described in the Twentieth Preferred Embodiment except that the temperature of polymerization was 300° C. and that the time for polymerization was 7.5 minutes; thereby obtaining a molded body having the Mw of 16,500.

Twenty-third Preferred Embodiment

A Twenty-third Preferred Embodiment employed the same compositions and the same manners as described in the Twenty-first Preferred Embodiment except that the temperature of polymerization was 300° C. and that the time for polymerization was 4 minutes; thereby obtaining a molded body having the Mw of 17,000.

Comparative Example 1

A Comparative Example 1 employed the same compositions and the same manners as described in the Sixteenth Preferred Embodiment except that the compound (iii) was not used and that the time for polymerization was 30 minutes; thereby obtaining a molded body having the Mw of 11,000.

Comparative Example 2

A Comparative Example 2 employed the same compositions and the same manners as described in the Sixteenth Preferred Embodiment except that the compound (iii) was not used and that the temperature of polymerization was 300° C. and that the time for polymerization was 15 minutes; thereby obtaining a molded body having the Mw of 15,500.

The above results are shown in Tables 4 and 5.

TABLE 4

| Embod. | Kinds of Compound (iii) | Amount of Compound (iii) (mmol) | Temper. of polymerization (°C.) | Time for Polymerization (min.) | Mw |
|---|---|---|---|---|---|
| 16 | $Al(O^iPr)_3$ | 0.78 | 250 | 18 | 11,500 |
| 17 | $Al(O^iPr)_3$ | 0.80 | 300 | 10 | 15,500 |
| 18 | $Al(O^iPr)_3$ | 1.60 | 300 | 7.5 | 16,500 |
| 19 | $Al(O^iPr)_3$ | 3.20 | 300 | 5 | 15,000 |
| 20 | $BPh_3$ | 0.80 | 250 | 15 | 12,000 |
| 21 | $BPh_3$ | 1.60 | 250 | 5 | 12,500 |
| 22 | $BPh_3$ | 0.80 | 300 | 7.5 | 16,500 |
| 23 | $BPh_3$ | 1.60 | 300 | 4 | 17,000 |

TABLE 5

| Compa. Exam. | Kinds of Compound (iii) | Amount of Compound (iii) (mmol) | Temper. of polymerization (°C.) | Time for Polymerization (min.) | Mw |
|---|---|---|---|---|---|
| 1 | — | — | 250 | 30 | 11,000 |
| 2 | — | — | 300 | 15 | 15,500 |

Figure 2:
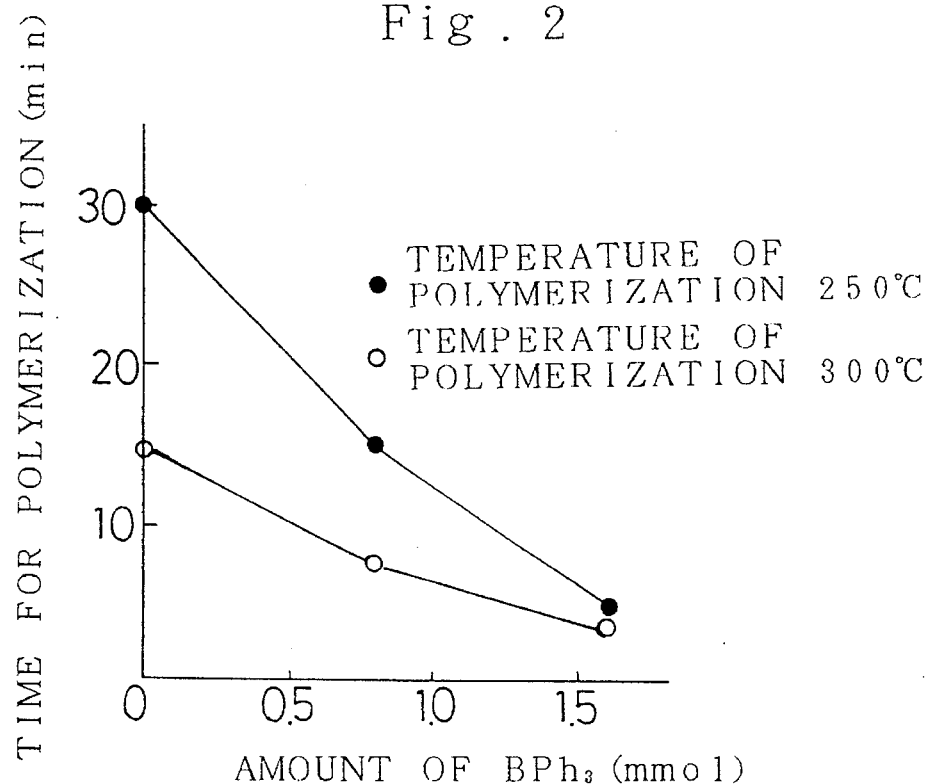
FIG. 2 is a graph for showing the relationship between a using amount of $BPh_3$ (compound (iii)) and the time for polymerization.
Figure 3:
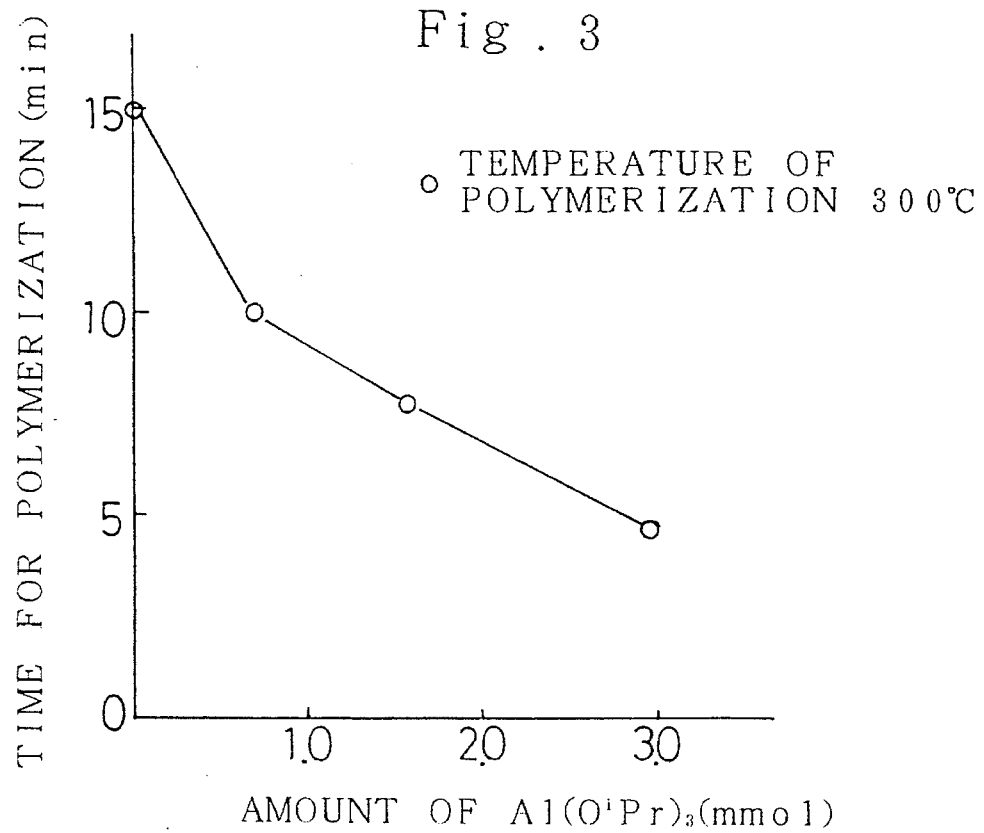
FIG. 3 is a graph for showing the relationship between a using amount of $Al(O^iPr)_3$ (compound (iii)) and the time for polymerization.

Concerning Table 4 and Table 5, the relationship between the amount of the compound (iii) and the time for polymerization are shown in FIGS. 2 and 3.

As apparent from FIGS. 2 and 3, when the amount of the compound (iii) increases, the time for polymerization is shortened. Namely, the degree and the time for polymerization can be controlled in accordance with the added amount of the compound (iii).

In RIM method of thermoplastic resin according to the present invention, the reaction of a material for thermoplastic resin never occurs before the material for thermoplastic resin is injected into the mold. As a result, the material for thermoplastic resin can be injected into the mold with maintaining low viscosity. Therefore, the material for thermoplastic resin never be resinified before it is injected into the mold, and fluidity in the mold never be deteriorated. Furthermore, in the process for forming FRP, impregnation characteristics of the thermoplastic resin is excellent so that the obtained FRP molded body is excellent in its mechanical characteristics.

Since the anionic polymerization catalyst which is generated by the reaction of the compound (i) and the compound (ii) has high activity, the time for reaction after injection is short and the time for molding can be shortened. Moreover, it is possible that the obtained molded body has high molecular weight, and the impact strength or the heat resistance can be improved.

The molecular weight of the thermoplastic resin can be controlled by controlling the added amount of the compound (iii) and the time for polymerization. When the molecular weight is set to be fixed, the time for polymerization can be shortened by controlling the added amount of the compound (iii).

Having now fully described the present invention, it will be apparent to one of ordinary skill in the art that many changes and modifications can be made thereto without departing from the spirit or scope of the present invention as set forth herein including the appended claims.

What is claimed is:

1. A RIM method of molding a thermoplastic resin comprising:

mixing a first compound (i) with a material polymerizable by anionic addition polymerization to form a thermoplastic resin to prepare a first mixture (I), mixing a second compound (ii) with a material polymerizable by anionic addition polymerization to form a thermoplastic resin to prepare a second mixture (II), said compounds (i) and (ii) each being inactive with respect to the polymerizable material in its respective mixture (I) or (II) but reacting with the other to produce a high-active anionic polymerization catalyst when mixed, and said mixtures (I) and (II) each containing from 0.01 to 10 mol % of its respective compound (i) or compound (ii);

mixing said mixture (I) and said mixture (II);

injecting the resulting mixture into a mold;

polymerizing the injected polymerizable material by anionic addition polymerization in the presence of a polymerization catalyst generated by the reaction of said compounds (i) and (ii), and ejecting the resulting solidified thermoplastic resin molded body from said mold.

2. The RIM method according to claim 1, wherein said compound (i) is represented by the chemical formula (1) $(R^1)$—O—Si—$(R^2)_3$ in which $R^1$ is an alkyl group having from 1 to 4 carbon atoms or an aryl group having 6 carbon atoms and $R^2$ is an alkyl group having from 1 to 3 carbon atoms or an aryl group having 6 carbon atoms, and said compound (ii) is represented by the chemical formula (2) $(R^3)$—F in which $R^3$ is an alkaline metal or an organic ammonium salt represented by the chemical formula $(C_nH_{2n+1})_4N$ wherein n is in the range of from 1 to 4.

3. The RIM method according to claim 2, wherein said $R^1$ is selected from the group consisting of a phenyl group, a methyl group, an ethyl group, a propyl group, an isopropyl group and a butyl group.

4. The RIM method according to claim 2, wherein said $R^2$ is selected from the group consisting of a phenyl group, a methyl group, an ethyl group and an isopropyl group.

5. The RIM method according to claim 2, wherein said $R^3$ is selected from the group consisting of Li, Na, K, Cs, tetramethyl ammonium and tetrabutyl ammonium.

6. The RIM method according to claim 1, wherein said compound (i) is represented by the chemical formula (3) $(R^4)_3$—B in which $R_4$ is an alkyl group having 4 carbon atoms or an aryl group having 6 carbon atoms, and said compound (ii) is represented by a chemical formula (4) $M1_2\text{-}CO_3$ in which M1 is an alkaline metal.

7. The RIM method according to claim 6, wherein said $R_4$ is a butyl group or a phenyl group.

8. The RIM method according to claim 6, wherein said M1 is selected from the group consisting of Li, Na and K.

9. The RIM method according to claim 1, wherein said compound (i) is represented by a chemical formula (5) $(R^5)_4B^{-+}M2$ in which $R^5$ is an alkyl group having from 1 to 4 carbon atoms or an aryl group having 6 carbon atoms and M2 is an alkaline metal, and said compound (ii) is represented by a chemical formula (6) $(R^6)_4N^{+-}(R^7)$ in which $R^6$ is an alkyl group having from 1 to 4 carbon atoms or an aryl group having 6 carbon atoms and $R^7$ is a halogen group or a hydroxyl group.

10. The RIM method according to claim 9, wherein said $R^5$ is selected from the group consisting of a phenyl group, a methyl group, an ethyl group, a propyl group, an isopropyl group and a butyl group.

11. The RIM method according to claim 9, wherein said M2 is selected from the group consisting of Li, Na, K and Cs.

12. The RIM method according to claim 9, wherein said $R^6$ is selected from the group consisting of a phenyl group, a methyl group, an ethyl group, an isopropyl group or a butyl group.

13. The RIM method according to claim 9, wherein said $R^7$ is selected from the group consisting of a chlorine group, a bromine group and a fluorine group.

14. A RIM method of molding a thermoplastic resin comprising:

mixing a first compound (i) with a material polymerizable by anionic addition polymerization to form a thermoplastic resin to prepare a first mixture (I), and mixing a second compound (ii) with a material polymerizable by anionic addition polymerization to form a thermoplastic resin to prepare a second mixture (II), each of the two compounds (i) and (ii) being inactive with respect to said material in its respective mixture but reacting with the other to produce a high-active anionic polymerization catalyst when mixed, each of said mixtures (I) and (II) containing from 0.01 to 10 mol % of its respective compound (i) or compound (ii), and at least one of said mixtures (I) and (II) containing a third compound (iii) which is a Lewis acid having no polymerization activity;

mixing said mixture (I) and the mixture (II);

injecting the resulting mixture into a mold;

polymerizing the injected polymerizable material by anionic addition polymerization, said polymerization being conducted in the presence of a polymerization catalyst generated by the reaction of said compounds (i) and (ii); and ejecting the resulting solidified thermoplastic resin molded body from said mold.

15. The RIM method according to claim 14, wherein said compound (i) is represented by the chemical formula (7) $(R^8)$—O—Si—$(R^9)_3$ in which $R^8$ is an alkyl group having from 1 to 4 carbon atoms or an aryl group having 6 carbon atoms and $R^9$ is an alkyl group having from 1 to 3 carbon atoms or an aryl group having 6 carbon atoms, and said compound (ii) is represented by the chemical formula (8) $(R^{10})$ F in which $R^{10}$ is an alkaline metal or an organic ammonium salt represented by the chemical formula $(C_nH_{2n+1})_4N$ wherein n is in the range of from 1 to 4, and said compound (iii) is represented by the chemical formula (9) Al—$(R^{11})_3$ in which $R^{11}$ is an alkoxy group represented by the chemical formula $(C_nH_{2n+1})$—O wherein n is in the range of from 1 to 4 or a halogen group.

16. The RIM method according to claim 15, wherein said $R^8$ is selected from the group consisting of a phenyl group, a methyl group, an ethyl group, a propyl group, an isopropyl group and a butyl group.

17. The RIM method according to claim 15, wherein said $R^9$ is selected from the group consisting of a phenyl group, a methyl group, an ethyl group and an isopropyl group.

18. The RIM method according to claim 15, wherein said $R^{10}$ is selected from the group consisting of Li, Na, K, Cs, tetramethyl ammonium and tetrabutyl ammonium.

19. The RIM method according to claim 15, wherein said $R^{11}$ is selected from the group consisting of a methoxy group, an ethoxy group, a butoxy group, a propoxy group, an isopropoxy group, bromine, chlorine and fluorine.

20. The RIM method according to claim 14, wherein said compound (i) is represented by the chemical formula (10) $(R^{12})$—O—Si—$(R^{13})_3$ in which $R^{12}$ is an alkyl group having from 1 to 4 carbon atoms or an aryl group having 6 carbon atoms and $R^{13}$ is an alkyl group having from 1 to 3 carbon atoms or an aryl group having 6 carbon atoms, and said compound (ii) is represented by the chemical formula (11) $(R^{14})$—F in which $R^{14}$ is an alkaline metal or an organic ammonium salt represented by the chemical formula $(C_nH_{2n+1})_4N$ wherein n is in the range of from 1 to 4, and said compound (iii) is represented by the chemical formula (12) B—$(R^{15})_3$ in which $R^{15}$ is an alkyl group having from 1 to 4 carbon atoms or an aryl group having 6 carbon atoms.

21. The RIM method according to claim 20, wherein said $R^{12}$ is selected from the group consisting of a phenyl group, a methyl group, an ethyl group, a propyl group, an isopropyl group and a butyl group.

22. The RIM method according to claim 20, wherein said $R^{13}$ is selected from the group consisting of a phenyl group, a methyl group, an ethyl group and an isopropyl group.

23. The RIM method according to claim 20, wherein said $R^{14}$ is selected from the group consisting of Li, Na, K, Cs, tetramethyl ammonium and tetrabutyl ammonium.

24. The RIM method according to claim 20, wherein said $R^{15}$ is selected from the group consisting of a phenyl group, a methyl group, an ethyl group, a propyl group, an isopropyl group and a butyl group.

25. The RIM method according to claim 1 or 14, wherein the mixed amount of said compound (i) is in the range of 0.01 to 10 mol % in said mixture (I).

26. The RIM method according to claim 1 or 14, wherein the mixed amount of said compound (ii) is in the range of 0.01 to 10 mol % in said mixture (II).

27. The RIM method according to claim 1 or 14, wherein said mixture (I) and said mixture (II) are injected into said mold immediately after they are mixed outside of said mold.

28. The RIM method according to claim 1 or 14, wherein said mixture (I) and said mixture (II) are injected into said mold so as to be mixed in the mold.

29. The RIM method according to claim 1 or 14, wherein said mixture (I) is mixed with mixture (II) in a molar ratio of said compound (i) to said compound (ii) in the range of 1:1 to 1:1.5.

* * * * *